Patented Sept. 15, 1931

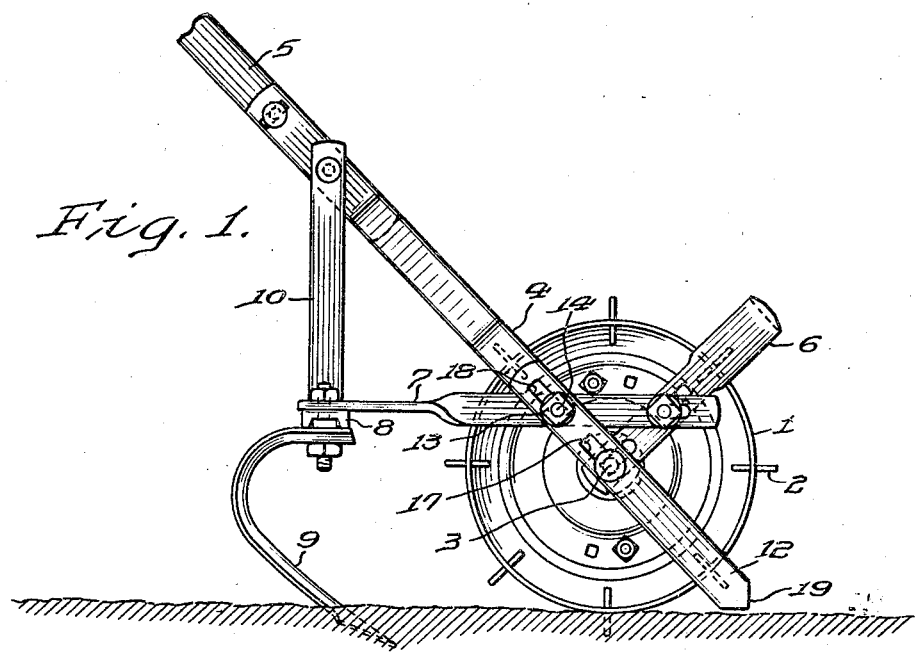
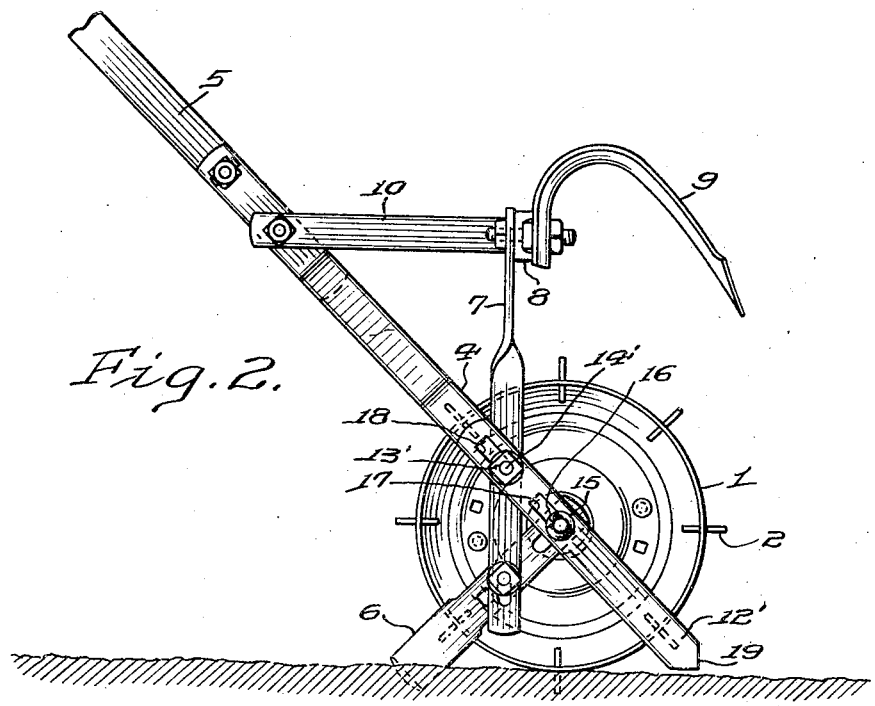

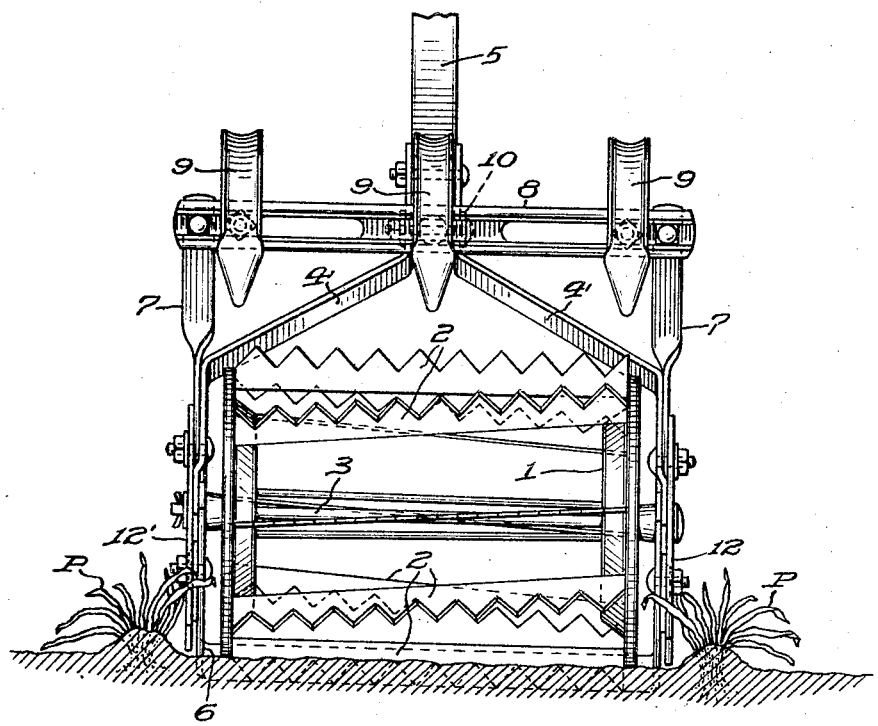

1,822,993

UNITED STATES PATENT OFFICE

JOSEPH MADER, OF PHILADELPHIA, PENNSYLVANIA, ASSIGNOR TO S. L. ALLEN & CO., INC., OF PHILADELPHIA, PENNSYLVANIA, A CORPORATION OF PENNSYLVANIA

LEAF GUARD FOR ROTARY CULTIVATORS

Application filed March 19, 1931. Serial No. 523,699.

This invention relates to agricultural implements and is directed particularly to providing leaf guards for a hand operated cultivating implement comprising a rotatable blade-carrying wheel and auxiliary ground engaging tools and adapted to be moved along the ground between rows of plants for the purpose of harrowing, scraping and pulverizing the soil.

In cultivating implements of this type the auxiliary ground engaging tools follow the rotating blades and complete the cultivation of the soil, and when the implement is moved along the ground between the rows of plants it occupies substantially the entire space between them, so that any leaves of the plants extending into this space for an appreciable distance are often cut by the ground engaging blades or otherwise damaged by the passage of the cultivator.

The ground engaging portions of the two sets of auxiliary tools ordinarily provided are usually substantially diametrically opposed with relation to the axis of the rotatable blade-carrying wheel, and an operating handle is arranged to extend angularly rearwardly upward from the axis on which the wheel turns and between the auxiliary tools, so that one set of auxiliary tools, for example, harrow teeth, may be employed for cultivating the ground when the handle is in one position and another tool, for example a hoe or scraper blade, may be similarly employed when the machine is turned over so as to bring what was formerly the under side of the handle uppermost.

Owing to the dual or reversible character of implements of this class whereby they are capable of operation in different ways depending on the position of the auxiliary blades and for other reasons, no satisfactory means, so far as I am aware, has heretofore been provided for moving the leaves of the plants away from the path of the several blades as the implement is moved along the rows.

A principal object of the present invention, therefore, is to provide a leaf guard for an implement of the class to which I have referred which is satisfactorily operative to remove or deflect the leaves of the plants from the path of the machine as it is moved between the rows irrespective of which of the auxiliary cultivating implements is being employed to complete the cultivation of the soil after the passage of the rotatable blade-carrying wheel thereover.

A further object of the invention is to provide a leaf guard of this character which may be adjusted with respect to the implement so as to penetrate lightly into the surface of the soil and thereby insure its engagement with the leaves of the plants even when they lie close against the ground, or which may be retracted so as to pass above the surface of the soil when desired, but which is fully operative for its intended purposes when either auxiliary implement is being utilized and which requires no adjustment or readjustment when changing from one of said implements to the other.

Still further objects of the invention are to provide in a cultivating implement of the general type to which I have referred, a pair of similar leaf guards respectively disposed on opposite sides of the machine and readily detachable therefrom so that either or both of the guards may be removed if desired; which are simple in construction and arrangement and require no attention after being once set to the desired operating position; which do not materially add to the cost or weight of the machine, and which are strong and of such character as to substantially negative the likelihood of injury or breakage through contact with stones or other obstacles while the cultivating implement is being operated or from the careless handling and rough usage to which such implements are frequently subjected.

Further purposes, objects and advantages of the invention will be hereinafter more specifically mentioned or will appear from the following more particular description of a prferred embodiment thereof in which reference will be had to the accompanying drawings.

In the said drawings, Fig. 1 is a fragmentary elevation of one side of a cultivator of the class hereinbefore mentioned and embodying my invention showing the implement in position for cultivating the soil with the aid of the harrow teeth to which reference has been made; Fig. 2 is a corresponding view of the other side of the cultivator after reversal from the position shown in Fig. 1 to enable the scraper blade or hoe attachment to be employed as the auxiliary cultivating tool, and Fig. 3 is a front elevation of the implement showing its relation to the rows of plants when it is being used as shown in Fig. 2. In the several figures like characters of reference designate the same parts.

Referring now more particularly to Fig. 1 for convenience of description, the cultivator illustrated therein, and to which my improved leaf guards are particularly applicable, comprises a rotatable drum or cage wheel 1 provided with toothed or serrated ground engaging blades 2 projecting beyond the periphery thereof and disposed somewhat angularly to the axis of the wheel. The wheel is rotatable about an axle 3, from the projecting ends of which handle brackets 4 extend rearwardly and angularly upward and are inwardly converged to receive the handle bar 5 by which the implement is pushed along the ground when in use. Also mounted on the axle 3 is a U-shaped scraper or hoe blade 6, the ground engaging portion thereof extending transversely of the implement and parallel to the axis of the wheel, while rearwardly extending bars 7 may be respectively bolted to the scraper member 6 and the handle brackets 4 on each side of the machine to maintain these parts in their proper relation, desirably at an angle of about 90° to each other. Supported on the projecting or rear ends of the bars 7 is a transverse gang bar 8 adapted to support the harrow teeth 9, the bar being securely braced to the handle by means of straps 10 suitably bolted to the respective parts.

The implement which I have just described for purposes of illustration may be considered as a typical example of cultivators of the general class in which my improved leaf guards may conveniently be employed, and as such cultivators are generally known in the art it is believed a more detailed description thereof would be superfluous. It will be understood, however, that in use the implement is pushed along the ground between two rows of plants P by means of the handle 5 and that the blades 2 of the wheel penetrate the soil in their passage thereover and thus break it into small particles. When the implement is in the position shown in Fig. 1, the subsequent passage of the harrow teeth through the soil further breaks it up and effects proper cultivation thereof, but when the implement is reversed to the position shown in Fig. 2, the harrow teeth are carried in elevated position and the scraper blade 6 breaks up the soil and cuts the roots of weeds growing therein after the passage of the rotating blades 2.

In accordance with my invention and for the purpose of preventing the passage of the ground engaging tools over the leaves of the plants in the rows between which the cultivator is passing, I provide leaf guards 12, 12' one of which may be disposed on each side of the cultivator and desirably supported on the axle 3 in alignment with the handle brackets 4. The guard 12 on one side of the machine is conveniently held in position under the head of the axle 3 and by the nut 13 and bolt 14 which serve to secure the arm 7 and the adjacent handle bracket 4 together in operative relation, and the guard 12' on the opposite side by a washer 15 and a cotter pin 16 carried by the axle 3 at its free end in the usual manner and by the corresponding nut 13' and bolt 14'. Each leaf guard may desirably be provided with longitudinal slots 17, 18 through which the axle 3 and the bolts above referred to respectively extend, and it will be apparent that in consequence the longitudinal position of the guard with respect to the handle bracket 4 may readily be adjusted within the limit of movement afforded by the slots by loosening the retaining parts and sliding the leaf guard to the desired position. Each leaf guard projects forwardly and downwardly from the axis of the wheel to a point somewhat beyond the outer edges of the serrated blades 2 and at its extremity is provided with a point 19 symmetrical with respect to the center line of the guard.

It will be apparent from the above description and the drawings that as the leaf guards are moved along or through the surface of the ground depending upon their respective positions of adjustment, the lower sides of the points 19 are maintained substantially parallel therewith while the other or upper sides are maintained in substantially vertical position in either operative position of the cultivator, and that the points precede the ground engaging blades. Thus the leaf guards engage the leaves of the plants at points in advance of the cultivating blades and first lift and then push them aside during its forward progress whereby the leaves are prevented from coming in contact with the rotating blades and auxiliary tool and from being run over and damaged thereby.

As my improved leaf guards are positioned in alignment with the handle bar 5, as shown in Figs. 1 and 2, irrespective of which of the auxiliary tools is in operative position, no adjustment or readjustment of the leaf guards is required in order to permit either auxiliary implement to be used, while the longitudinal adjustability of the leaf guards with respect to the handle through the provision of the slots 17, 18 permits the guards to be carried along the row in any desired position with respect to the soil. Consequently, once the guards have been set in a given relation to the surface of the latter, that relation is preserved irrespective of reversals of the machine to bring one or the other auxiliary tool into play, thus insuring adequate protection of the plant leaves irrespective of the manner in which the machine is being used.

It will be understood that minor changes in constructional details and the like may be made in my improved leaf guards and that they may be employed in cultivators and/or generally similar implements of types other than that herein shown and described, without departing from the spirit and scope of the invention as defined in the appended claims.

Having thus described my invention, I claim and desire to protect by Letters Patent of the United States:

1. The combination with a cultivating implement comprising a rotatable wheel having ground engaging blades, an axle on which the wheel is mounted, handle supports extending from opposite ends of the axle, a handle carried by said supports, auxiliary ground engaging tools respectively occupying different relations to the handle and selectively operable to engage the ground in rear of the wheel by reversing the implement, of a leaf guard disposed on each side of the implement and comprising a rigid bar parallel to the adjacent handle support and projecting on the opposite side of the axle therefrom to a point in advance of the wheel in either operative position of the machine.

2. The combination with a cultivating implement comprising a rotatable wheel having ground engaging blades, an axle on which the wheel is mounted, handle supports extending from opposite ends of the axle, a handle carried by said supports, auxiliary ground engaging tools respectively occupying different relations to the handle and selectively operable to engage the ground in rear of the wheel by reversing the implement, of a leaf guard disposed on each side of the implement and comprising a rigid bar extending parallel to the adjacent handle support in opposite directions from the axle, one end of the bar terminating in advance of the wheel in either operative position of the machine and provided with a point symmetrical with respect to the center line of the bar and the other end extending adjacent the handle support, and means cooperative with said last mentioned end to maintain the bar with its point in predetermined relation to the ground line.

3. The combination with a manually operable cultivating implement comprising a rotatable ground engaging wheel and auxiliary cultivating tools respectively selectively operable to engage the ground in rear of the wheel by reversal of the implement from one operative position to another, an axle about which the wheel is rotatable, handle supports extending from the axle, and a handle carried by said supports, of a leaf guard comprising a rigid bar disposed adjacent and extending parallel to one of said supports and terminating in advance of the wheel in a ground engaging point, and means for operatively maintaining the bar in aligned position with the supports whereby the point of the bar is adapted to precede the wheel in either operative position of the machine and raise from the path thereof leaves projecting from adjacent rows of plants.

4. The combination with a manually operable cultivating implement comprising a rotatable ground engaging wheel and auxiliary cultivating tools respectively selectively operable to engage the ground in rear of the wheel by reversal of the implement from one operative position to another, an axle about which the wheel is rotatable, handle supports extending from the axle, and a handle carried by said supports, of a leaf guard comprising a rigid bar disposed adjacent one of the handle supports, extending on opposite sides of the axle and provided with longitudinal slots, one part of the bar terminating in advance of the wheel and being provided with a point and the other part lying adjacent and paralleling said support, and means for holding the bar in longitudinally adjusted relation to said support and axle.

5. The combination with a manually operable cultivating implement comprising a rotatable ground engaging wheel and auxiliary cultivating tools respectively selectively operable to engage the ground in rear of the wheel by reversal of the implement from one operative position to another, an axle about which the wheel is rotatable, handle supports extending from the axle, and a handle carried by said supports, of a leaf guard comprising a rigid bar disposed adjacent one of the handle supports, extending on opposite sides of the axle and provided with longitudinal slots, one part of the bar terminating in advance of the wheel and being provided with a point symmetrical with respect to the center line of the bar and the other and slotted part lying adjacent and paralleling said support, and means cooperative with said slots and including the axle for holding the bar in longitudinally adjusted relation to said support and axle.

6. The combination with a cultivating implement of the class described comprising a rotatable ground engaging wheel, a handle for propelling the implement and auxiliary ground engaging tools selectively operable to follow the wheel by reversal of the implement from one position to another, of a leaf guard disposed at each side of the implement to extend parellel to the handle and projecting in advance of the wheel in either operative position of the implement.

In witness whereof, I have hereunto set my hand this 18th day of March, 1931.

JOSEPH MADER.